(12) United States Patent
Takehara et al.

(10) Patent No.: US 11,170,326 B2
(45) Date of Patent: Nov. 9, 2021

(54) SCHEDULE MANAGING METHOD AND SCHEDULE MANAGING APPARATUS

(71) Applicant: Panasonic Intellectual Property Management Co., Ltd., Osaka (JP)

(72) Inventors: Hirokazu Takehara, Fukuoka (JP); Hiroki Sagara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 76 days.

(21) Appl. No.: 16/351,842

(22) Filed: Mar. 13, 2019

(65) Prior Publication Data

US 2019/0303839 A1 Oct. 3, 2019

(30) Foreign Application Priority Data

Mar. 30, 2018 (JP) .............................. JP2018-067330

(51) Int. Cl.
*G06Q 10/06* (2012.01)
(52) U.S. Cl.
CPC ............................ *G06Q 10/063116* (2013.01)
(58) Field of Classification Search
CPC .............................................. G06Q 10/063116
See application file for complete search history.

(56) References Cited

U.S. PATENT DOCUMENTS

| 5,216,612 | A | * | 6/1993 | Cornett | G05B 19/4184 |
| | | | | | 700/96 |
| 5,237,508 | A | * | 8/1993 | Furukawa | G05B 19/41865 |
| | | | | | 700/100 |
| 5,285,392 | A | * | 2/1994 | Kyle | G05B 19/41865 |
| | | | | | 700/100 |
| 5,406,476 | A | * | 4/1995 | Deziel, Jr. | G06Q 10/06 |
| | | | | | 705/7.15 |

(Continued)

FOREIGN PATENT DOCUMENTS

JP 2005-031794 2/2005

OTHER PUBLICATIONS

User interface aspects of an MRP II planning module M Nussbaum, G Garretón, A Lepe, E Parra—Computational Economics, 1993—Springer (Year: 1993).*

(Continued)

*Primary Examiner* — Jonathan G Sterrett
(74) *Attorney, Agent, or Firm* — Pearne & Gordon LLP

(57) ABSTRACT

A schedule managing method includes: a number-of-worker inputting step of inputting the number of workers who perform arrangement work of arranging the members to arrangement means, in association with a production time point for producing products; a preparation time point changing step of changing a start time point or an end time point of the arrangement work in a preparation work schedule based on a work quantity of the arrangement work and the number of workers; a production time point changing step of changing a start time point or an end time point of (Continued)

production of the products in a production schedule based on a start time point or an end time point of the changed arrangement work; and a displaying step of displaying the production schedule, the preparation work schedule, and the number of workers along the production time point.

8 Claims, 10 Drawing Sheets

(56) References Cited

U.S. PATENT DOCUMENTS

| | | | | |
|---|---|---|---|---|
| 5,692,030 | A * | 11/1997 | Teglovic | H04M 3/10 370/250 |
| 5,946,663 | A * | 8/1999 | Tanaka | G06Q 10/06 705/7.25 |
| 5,993,041 | A * | 11/1999 | Toba | G05B 19/41865 700/99 |
| 6,336,053 | B1 * | 1/2002 | Beatty | G05B 19/4188 700/108 |
| 7,139,722 | B2 * | 11/2006 | Perrella | G06Q 10/063116 705/7.19 |
| 7,246,423 | B1 * | 7/2007 | Holden | E06B 3/673 29/411 |
| 7,593,712 | B2 * | 9/2009 | Moton, Jr. | H04L 41/12 455/404.2 |
| 7,693,735 | B2 * | 4/2010 | Carmi | G06Q 10/06398 705/7.16 |
| 2001/0027406 | A1 * | 10/2001 | Araki | G06Q 10/063116 705/7.16 |
| 2002/0128850 | A1 * | 9/2002 | Chen | G06Q 10/103 705/301 |
| 2002/0178188 | A1 * | 11/2002 | Irizarry | G06Q 10/06 715/243 |
| 2003/0126103 | A1 * | 7/2003 | Chen | G06Q 10/06 706/50 |
| 2004/0044554 | A1 * | 3/2004 | Bull | G06Q 10/063114 705/7.19 |
| 2008/0133309 | A1 * | 6/2008 | Maggio | G06Q 10/06315 705/7.26 |
| 2019/0049935 | A1 * | 2/2019 | Ikeda | H05K 13/085 |
| 2020/0176287 | A1 * | 6/2020 | Davies | H01L 21/67132 |

OTHER PUBLICATIONS

An Interactive MRP II—Scheduling System M Nussbaum, M Singer, G Garretón . . . - . . . Resource Planning (MRP . . . , 1998—Springer (Year: 1998).*

Distributed Object Technologies in Manufacturing Execution Systems PMPA Blanco, MA Poli, MRP Barretto—researchgate.net 2004 (Year: 2004).*

"Observations on PCB assembly optimization", M Johnsson, J Smed—Electronic Packaging and Production . . . , 2001—Citeseer (Year: 2001).*

"Our New Desktop Pick and Place Machine", Jan. 23, 2018, retrieved from https://www.sparkfun.com/news/2586 (Year: 2018).*

"JUKI releases Long Board SMT Placement Machine JX-350", Apr. 26, 2015, retrieved from the web at https://www.juki.co.jp/ir_e/pdf/n150426e.pdf (Year: 2015).*

* cited by examiner

| LOT NUMBER | MODEL NUMBER | NUMBER OF MEMBERS | PRODUCTION QUANTITY |
|---|---|---|---|
| A | X1 | 95 | 250 |
| B | X2 | 110 | 300 |
| C | X1 | 95 | 380 |
| D | X3 | 98 | 200 |
| E | X4 | 114 | 350 |
| F | X5 | 101 | 800 |

| WORK CONTENT | UNIT WORK QUANTITY |
|---|---|
| REPLACEMENT OF CARRIAGE GROUP OF COMPONENT MOUNTING LINE | 20 (PERSONS·MINUTES) |
| DETACHMENT OF TAPE FEEDER FROM CARRIAGE | 0.3 (PERSONS·MINUTES) |
| ATTACHMENT OF TAPE FEEDER TO CARRIAGE | 1.0 (PERSONS·MINUTES) |
| CHECKING OF TAPE FEEDER AND REEL | 0.2 (PERSONS·MINUTES) |

↑ 41  ↑ 42

1

SCHEDULE MANAGING METHOD AND SCHEDULE MANAGING APPARATUS

BACKGROUND

1. Technical Field

The present disclosure relates to a schedule managing method and a schedule managing apparatus for managing a production schedule for producing a product on a production line.

2. Description of the Related Art

A plurality of models of products are produced on a production line for producing a product such as a mounting board on which an electronic component is mounted. When a model of a product to be produced is changed, set-up changing of changing a member that is used for producing a product in the production line is performed. The set-up changing includes an external set-up that is performed in a place other than the production line in parallel with the production of the product, in addition to an internal set-up that is performed in the production line. When a production schedule for producing a plurality of models of products is created, a schedule in which a product can be produced within a delivery date is created, also with consideration for a preparation schedule of set-up changing or the like (for example, Japanese Patent Unexamined Publication No. 2005-31794). Japanese Patent Unexamined Publication No. 2005-31794 discloses a Gantt chart that shows a production schedule and a preparation schedule in a time series such that it is possible to easily know the production schedule and the preparation schedule of an external set-up.

SUMMARY

According to the present disclosure, there is provided a schedule managing method used in a schedule managing apparatus that manages a production schedule on a production line for producing a plurality of models of products and a preparation work schedule for arranging members corresponding to the plurality of models on arrangement means which is attached to the production line so as to arrange the members that are used for production of the products, the method including: a number-of-worker inputting step of inputting the number of workers who perform arrangement work of arranging the members on the arrangement means, in association with a production time point for producing the products; a preparation time point changing step of changing a start time point or an end time point of the arrangement work in the preparation work schedule based on a work quantity of the arrangement work and the number of workers; a production time point changing step of changing a start time point or an end time point of the production of the products in the production schedule based on a start time point or an end time point of the changed arrangement work; and a displaying step of displaying the production schedule, the preparation work schedule, and the number of workers along the production time point.

According to the present disclosure, there is provided a schedule managing apparatus that manages a production schedule on a production line for producing a plurality of models of products and a preparation work schedule for arranging members corresponding to the plurality of models on arrangement means which is attached to the production line so as to arrange the members that are used for production of the products, the apparatus including: a number-of-worker inputter that is used to input the number of workers who perform arrangement work of arranging the members to the arrangement means, in association with a production time point for producing the products; a preparation time point changer that changes a start time point or an end time point of the arrangement work in the preparation work schedule based on a work quantity of the arrangement work and the number of workers; a production time point changer that changes a start time point or an end time point of the production of the products in the production schedule based on a start time point or an end time point of the changed arrangement work; and a display that displays the production schedule, the preparation work schedule, and the number of workers along the production time point.

In the present disclosure, it is possible to easily know a relationship between the production schedule of the products in the production line and the number of workers who are employed in preparation work of the production.

BRIEF DESCRIPTION OF THE DRAWINGS

FIG. 6 is a diagram of an example of lot information that is used in the managing computer (schedule managing apparatus) of the exemplary embodiment of the present disclosure;

FIG. 7 is a diagram of an example of unit work quantity information that is used in the managing computer (schedule managing apparatus) of the exemplary embodiment of the present disclosure;

DETAILED DESCRIPTION

Although the number of workers who are employed in the external set-up is changed in a preparation schedule of an external set-up, in a Gantt chart disclosed in Japanese Patent Unexamined Publication No. 2005-31794, there is a problem in that it is difficult to know a relationship between the number of workers and a production schedule, and thus there is room for further improvement in order to manage the production schedule with consideration for a personnel schedule.

In this respect, an object of the present disclosure is to provide a schedule managing method and a schedule managing apparatus by which it is possible to easily know a relationship between the production schedule of the product in the production line and the number of workers who are employed in preparation work of the production.

Figure 3:
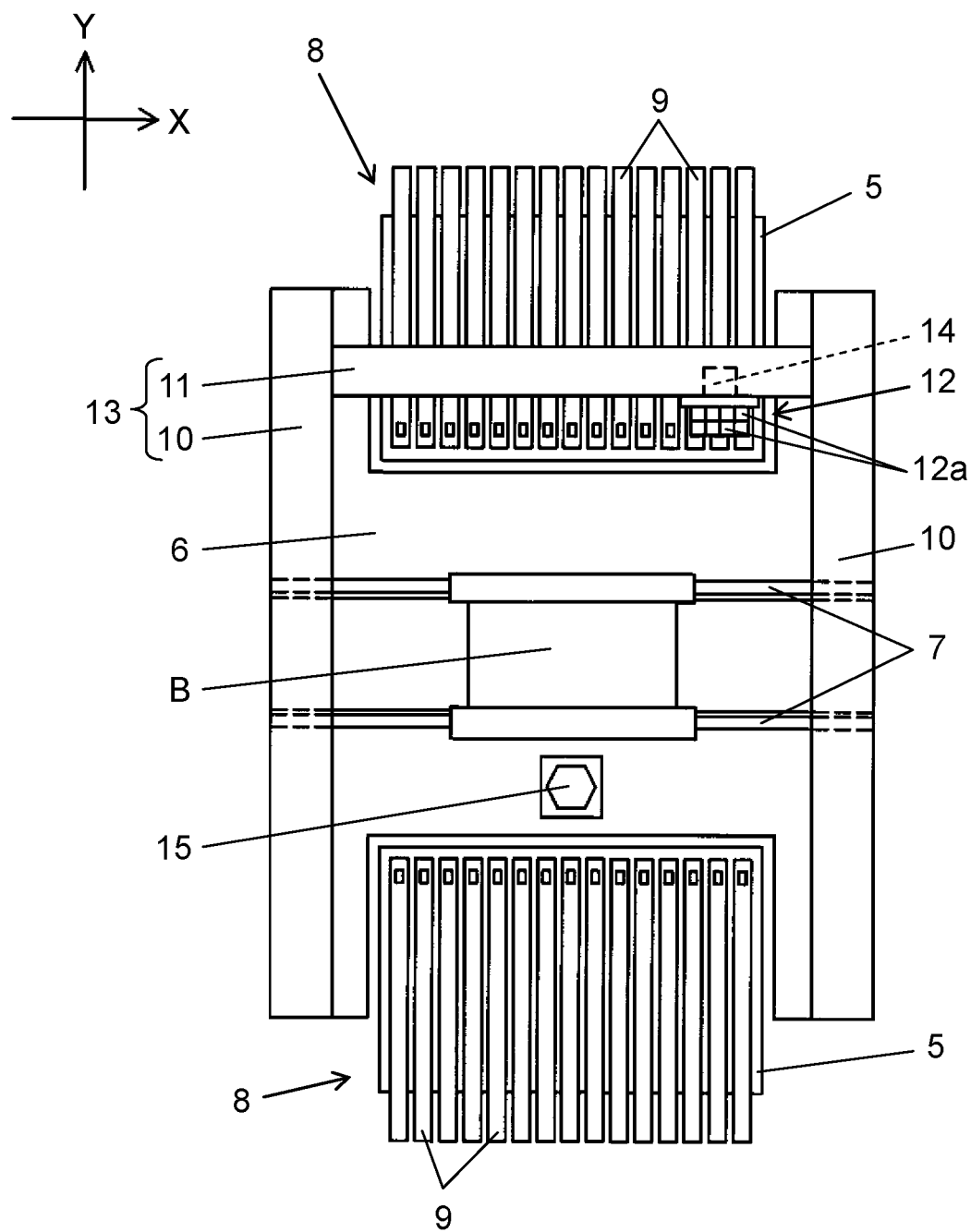
FIG. 3 is a plan view of a component mounter included in the component mounting system of the exemplary embodiment of the present disclosure.
Figure 4:
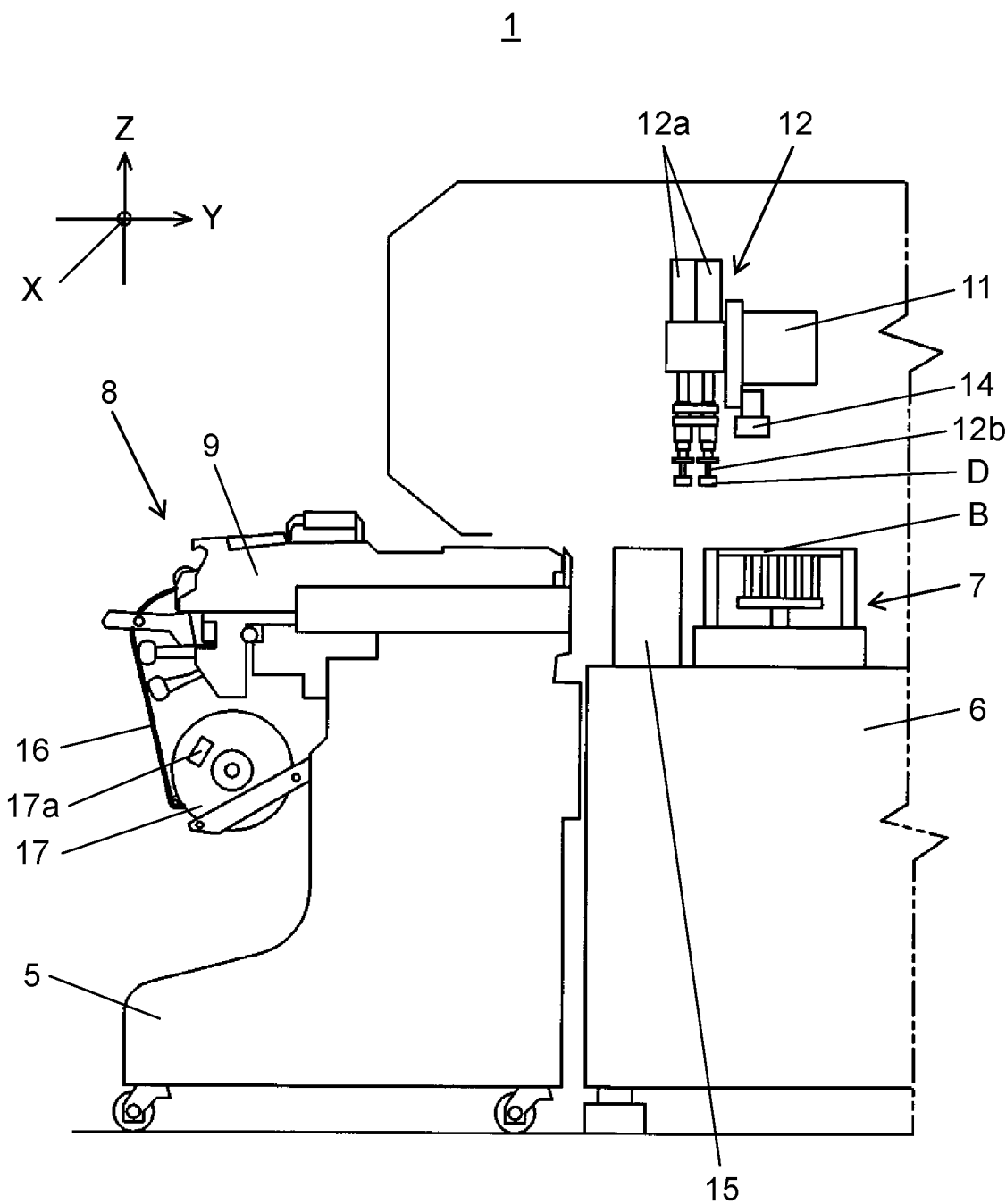
FIG. 4 is a partial sectional view of the component mounter included in the component mounting system of the exemplary embodiment of the present disclosure.

Hereinafter, exemplary embodiments of the present disclosure will be described in detail with reference to the drawings. A configuration, a shape, or the like to be described below, is an example for providing the description and can be appropriately modified according to specifications of a component mounting system, a component mounting line, a component mounter, and a carriage. Hereinafter, the same reference signs are assigned to corresponding elements in all of the drawings, and thus repeated description thereof is omitted. In FIG. 3 and a part of the following description, an X direction (right-left direction in FIG. 3) of a board transporting direction and a Y direction (vertical direction in FIG. 3) orthogonal to the board transporting direction are illustrated as two axial directions which are orthogonal to each other in a horizontal plane. In FIG. 4, a Z direction (vertical direction in FIG. 4) is illustrated as a height direction orthogonal to the horizontal plane. The Z direction is the vertical direction or an orthogonal direction in a case where the component mounter is installed on a horizontal plane.

First, a configuration of component mounting system 1 is described with reference to FIG. 1. Component mounting system 1 has a configuration in which three component mounting lines L1 to L3 arranged on floor F are connected to each other via communication network 2 and managing computer 3 manages the three component mounting lines. Component mounting lines L1 to L3 are arranged in production area Ap provided on floor F. Component mounting lines L1 to L3 are configured of a plurality of connected pieces of production equipment including the component mounter as will be described below and have a function of producing a mounting board having a configuration in which an electronic component is mounted on a board. There is no need to provide three component mounting lines L1 to L3 in component mounting system 1, and two and four or more component mounting lines may be provided.

Arrangement work supporting device 4 is disposed in preparation area As different from production area Ap provided on floor F. Arrangement work supporting device 4 is connected to managing computer 3 via communication network 2. Carriage 5 for replacement, which is a target of arrangement work to be described below, is connected to arrangement work supporting device 4. A plurality of carriages 5 having various statuses such as before, while, or after the arrangement work is performed are stored in preparation area As.

Figure 1:
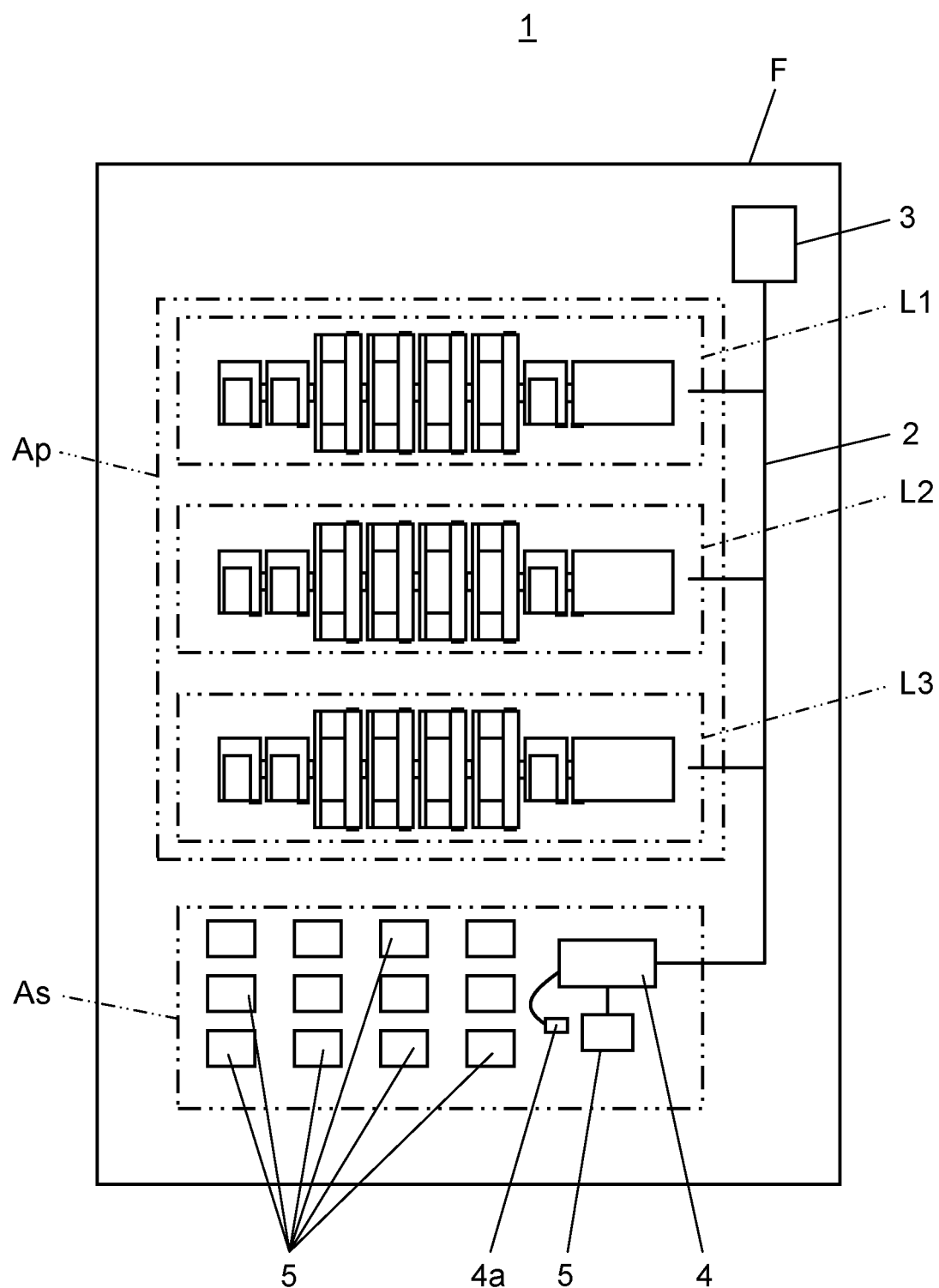
FIG. 1 is a diagram for illustrating a configuration of a component mounting system of an exemplary embodiment of the present disclosure.

In FIG. 1, on carriage 5 connected to arrangement work supporting device 4, a worker performs the arrangement work of installing a plurality of tape feeders 9 (refer to FIG. 3) or the like, which supply an electronic component, on carriage 5, in accordance with a work instruction corresponding to a model of mounting board that is produced on component mounting lines L1 to L3 from the carriage. When tape feeder 9 is installed on carriage 5 connected to arrangement work supporting device 4, electric power is supplied to tape feeder 9 by arrangement work supporting device 4 via carriage 5 such that a feeder controller (not illustrated) that is internally provided in tape feeder 9 comes into a state of being capable of communicating with managing computer 3.

The worker includes a working device that performs the arrangement work of installing the plurality of tape feeders 9 or the like, which supply an electronic component, on carriage 5, in accordance with the work instruction corresponding to the model of mounting board to be produced, in addition to a person who performs work. The working device may be configured to complete the arrangement work inside the device or include an articulated robot that performs the arrangement work in a procedure close to a work procedure performed by a person outside the device. In addition, the number of workers may include only one or both the persons and the working devices.

Consequently, in managing computer 3, it is possible to acquire a state of arrangement work such as an installation state of tape feeder 9 to carriage 5 or a supply state of carrier tape 16 (refer to FIG. 4), in which the electronic component to be installed in tape feeder 9 is held, to tape feeder 9. In the arrangement work, carrier tape 16 is attached to tape feeder 9. Code reader 4a included in arrangement work supporting device 4 performs work of reading and checking information of barcode 17a (refer to FIG. 4) or the like on reel 17 that is housed in a state in which carrier tape 16 is wound. There is no need to provide one arrangement work supporting device 4 that is disposed in preparation area As, and two or more arrangement work supporting devices may be provided.

As described above, on carriages 5 in preparation area As, which include carriage 5 connected to arrangement work supporting device 4, it is possible to perform the arrangement work in parallel with the production of the mounting board in component mounting lines L1 to L3. When a model of mounting board to be produced in component mounting lines L1 to L3 is changed, the worker moves carriage 5, on which tape feeder 9 is installed in preparation area As, to component mounting lines L1 to L3 and performs replacement work of replacing carriage 5 installed in the component mounter.

Figure 2:
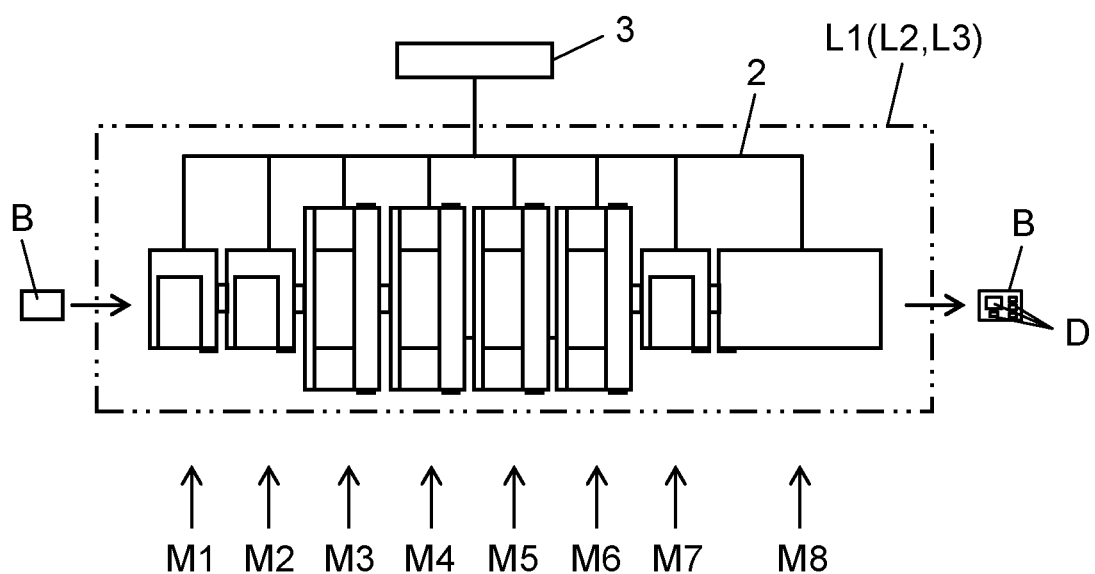
FIG. 2 is a diagram for illustrating a configuration of a component mounting line included in the component mounting system of the exemplary embodiment of the present disclosure.

Next, a detailed configuration of component mounting lines L1 to L3 will be described with reference to FIG. 2. Component mounting lines L1 to L3 have the same configuration as each other and, hereinafter, component mounting line L1 will be described. Component mounting line L1 has a configuration in which production equipment such as solder printing device M1, print inspecting device M2, component mounters M3 to M6, mounting inspecting device M7, and reflow device M8, are connected to each other in series from an upstream side (left side on the paper surface) to a downstream side (right side on the paper surface) in a board transporting direction. Component mounting line L1 is a production equipment group that is connected via communication network 2, and the pieces of production equipment may not be physically connected to each other.

Solder printing device M1, print inspecting device M2, component mounters M3 to M6, mounting inspecting device M7, and reflow device M8 are connected to managing computer 3 via communication network 2. Solder printing device M1 performs a solder printing job in which printing is performed with solder by a solder printing-job operator via a mask onto board B brought in from the upstream side. Print inspecting device M2 performs print inspecting work of inspecting a state of solder printed on board B by print inspecting work operator including a solder inspecting camera. A solder applicator that applies the solder on board B may be provided along with solder printing device M1 or instead of solder printing device M1. In addition, component mounting line L1 may not include print inspecting device M2.

Component mounters M3 to M6 perform component mounting work of mounting electronic component D on board B by a component mounting work operator. Component mounting line L1 is not limited to a configuration in which four component mounters M3 to M6 are provided, and one to three or five or more component mounters M3 to M6 may be provided. Mounting inspecting device M7 performs mounting inspecting work of inspecting a state of electronic component D mounted on board B by mounting inspecting work operator including a component inspecting camera. Reflow device M8 heats board B brought in the device by a board heater, causes the solder on board B to harden, and performs board heating work of bonding an electrode portion of board B to electronic component D. Component mounting line L1 may not include mounting inspecting device M7.

Next, a configuration of component mounters M3 to M6 will be described with reference to FIGS. 3 and 4. Component mounters M3 to M6 have the same configuration as each other and, here, component mounter M3 will be described. Component mounter M3 has a function of mounting electronic component D on board B. In FIG. 3, board transport mechanism 7 is disposed in an X direction at the center of base stand 6. Board transport mechanism 7 transports board B brought in from the upstream side in the X direction and positions and holds the board at a mounting working position by a mounting head to be described below. In addition, board transport mechanism 7 brings out board B, on which the component mounting work is ended, to the downstream side. Component suppliers 8 are disposed on both sides of board transport mechanism 7.

Carriage 5, on which the plurality of tape feeders 9 are installed side by side in the X direction, is attached to each of component supplier 8. Tape feeder 9 performs pitch feeding of the carrier tape provided with a pocket for housing electronic component D in a direction (tape feeding direction) from outside of component supplier 8 toward board transport mechanism 7, thereby supplying electronic component D to a component picking-up position at which the mounting head picks up electronic component D.

In FIG. 3, Y-axis tables 10 including a linear drive mechanism are disposed at both end portions of a top surface of base stand 6 in the X direction. On Y-axis table 10, beam 11 including a linear mechanism, which is similar to Y-axis table 10, is bonded to Y-axis table 10 so as to move freely in the Y direction. Mounting head 12 is installed on beam 11 so as to move freely in the X-axis direction. Mounting head 12 has a plurality of (here, eight) nozzle units 12a. In FIG. 4, each of nozzle units 12a has a lower end portion provided with suction nozzle 12b that performs vacuum suction of electronic component D so as to hold the electronic component.

In FIG. 3, mounting head moving mechanism 13 is configured to include Y-axis table 10 and beam 11 and moves mounting head 12 in a horizontal direction (X direction and Y direction). Mounting head moving mechanism 13 and mounting head 12 perform the component mounting work in which suction nozzle 12b suctions and picks up electronic component D from the component picking-up position of tape feeder 9 installed in component supplier 8 and conveys and mounts the electronic component at a mounting position of board B held by board transport mechanism 7.

In FIGS. 3 and 4, head camera 14 that is positioned on an undersurface side of beam 11 so as to integrally move along with mounting head 12 is installed on beam 11. Mounting head 12 moves, and thereby head camera 14 moves above board B positioned at the mounting working position of board transport mechanism 7 so as to image a board mark (not illustrated) provided on board B. In this manner, a position of board B is recognized.

Component recognition camera 15 is disposed between component supplier 8 and board transport mechanism 7. When mounting head 12 that has taken out electronic component D from component supplier 8 moves above the component recognition camera, component recognition camera 15 images electronic component D held by suction nozzle 12b so as to recognize a holding position or the like. In the component mounting work of electronic component D to board B by mounting head 12, the mounting position is corrected with consideration for a recognition result of board B by head camera 14 and a recognition result of electronic component D by component recognition camera 15.

In FIG. 4, reel 17, around which carrier tape 16 housing electronic component D is wound, is held on a front side of carriage 5. Tape feeder 9 transports carrier tape 16, which is housed in reel 17, in a tape feeding direction, so as to supply electronic component D to a component picking-up position by mounting head 12.

As described above, component mounters M3 to M6 are the production equipment that produces mounting board on which electronic component D as a product is mounted, and component mounting lines L1 to L3 including component mounters M3 to M6 are production lines that produce the mounting board. Carriage 5 is arrangement means on which members (tape feeder 9 and reel 17) which are used in the production of the product (mounting board) are arranged. Carriage 5 is attached to component mounters M3 to M6 configuring component mounting lines L1 to L3 such that the members are arranged.

Next, a configuration of managing computer 3 will be described with reference to FIG. 5. Managing computer 3 includes inputter 28 and display 29, in addition to processor 20, production schedule storage 25, preparation work schedule storage 26, and worker information storage 27 which are storage devices. Processor 20 is a data processing device such as the CPU and includes preparation time point changer 21, production time point changer 22, input processor 23, and display processor 24 as internal processors. Managing computer 3 does not need to be configured of one computer and may be configured of a plurality of devices. For example, the entire or a part of storage device may include a cloud via a server.

Inputter 28 is an input device such as a keyboard, a touch panel, or a mouse and is used in an operating command, during data input, or the like. Display 29 is a display device such as a liquid crystal panel and displays various items of information such as an operating screen for an operation by inputter 28, as well as various items of data stored in the storages.

Figure 5:
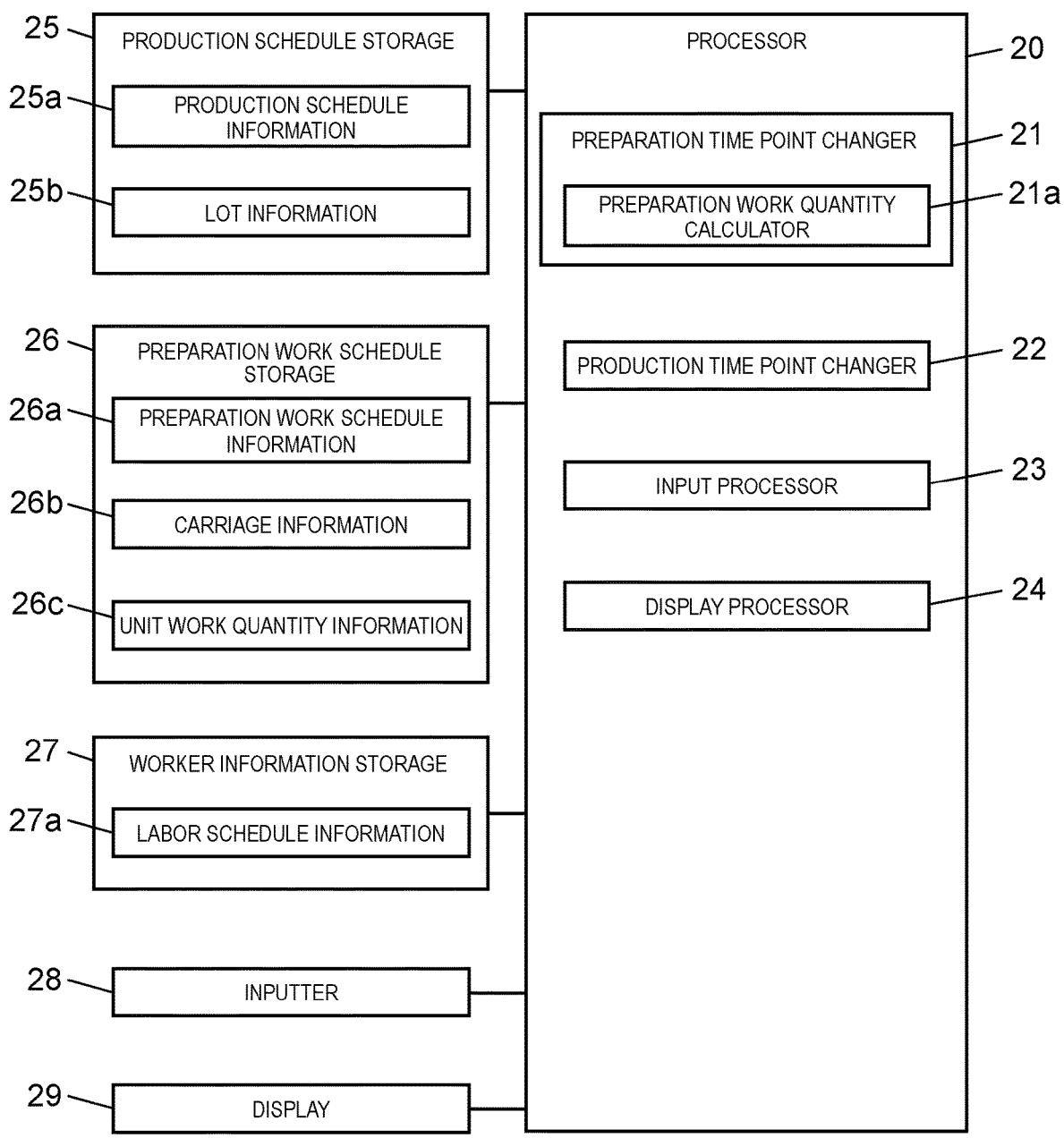
FIG. 5 is a block diagram illustrating a configuration of a managing computer (schedule managing apparatus) of the exemplary embodiment of the present disclosure.

In FIG. 5, production schedule storage 25 stores production schedule information 25a, lot information 25b, or the like. In production schedule information 25a, a line number for identifying component mounting lines L1 to L3 that produce a mounting board, a start time point and an end time point of production, a time point of replacement work of carriage 5 in component mounting lines L1 to L3, or the like is stored for each lot number for identifying a lot of the mounting board to be produced. In lot information 25b, a model number for identifying a model of the mounting board, the number of tape feeders 9 (members) that are used in the production of the model, the number of mounting boards to be produced, or the like is stored for each lot number for identifying the lot of the mounting board to be produced.

Here, an example of lot information 25b is described with reference to FIG. 6. Lot information 25b includes "lot number" 31, "model number" 32, "number of members" 33, and "number of production" 34. "Lot number" 31 is a lot number of the mounting board to be produced in component mounting lines L1 to L3. "Model number" 32 is a model number for identifying a model of the mounting board. "Number of members" 33 is the number of tape feeders 9 (members) that are used in production of the model. "Number of production" 34 is the number of mounting boards to be produced of each lot. In this example, lot information 25b includes information for six lots of lot number "A" to lot number "F". In the lots of lot number "A" and lot number "C", the same models of model number "X1" are produced.

In FIG. 5, preparation work schedule storage 26 stores preparation work schedule information 26a, carriage information 26b, unit work quantity information 26c, or the like. In preparation work schedule information 26a, the start time point and the end time point of arrangement work of arranging members (tape feeder 9 and reel 17) corresponding to a model on carriage 5 (arrangement means) are stored for each model of mounting board. In carriage information 26b, a carriage group number for identifying the plurality of carriages 5 which are simultaneously attached to component mounting lines L1 to L3 and used to produce the mounting boards, a carriage number for identifying carriage 5, the number of tape feeders 9 that can be mounted, or the like is stored. In unit work quantity information 26c, a unit work quantity of each work is stored for each work content of the arrangement work.

Here, an example of unit work quantity information 26c is described with reference to FIG. 7. Unit work quantity information 26c includes "work content" 41 and "unit work quantity" 42. "Work content" 41 is the work content of the arrangement work. "Unit work quantity" 42 is the unit work quantity of each work and time (minute) taken in a case where one worker performs work. Work, in which "work content" 41 is "replacement of a carriage group in the component mounting lines", means work of replacing a group of carriages 5 (carriage group) that is installed in component mounters M3 to M6 included in component mounting lines L1 to L3 with a carriage group, on which members to be produced next time are arranged, and unit work means the work of replacing one carriage group.

Work of "detaching the tape feeder from the carriage" is work of detaching installed tape feeder 9 and reel 17 from carriage 5, and unit work is work of detaching one tape feeder 9 and reel 17 housing carrier tape 16, which is supplied to tape feeder 9, from carriage 5. Work of "attaching the tape feeder to the carriage" is work of installing tape feeder 9 and reel 17 to carriage 5, and unit work is work of attaching one tape feeder 9 and reel 17 housing carrier tape 16, which is supplied to tape feeder 9, to carriage 5.

Work of "checking the tape feeder and reel" is work of reading barcode 17a of reel 17 installed on carriage 5 by code reader 4a and checking that installed reel 17 matches a reel in the work instruction, and unit work is checking work of one reel 17. As described above, the arrangement work includes at least one of work of detaching the members (tape feeder 9 and reel 17) from the arrangement means (carriage 5), work of attaching the member to the arrangement means, and work of checking the member attached to the arrangement means.

In FIG. 5, worker information storage 27 stores labor schedule information 27a or the like. Labor schedule information 27a includes the number of workers, who work on floor F, or the like for each production time point. Display processor 24 acquires various items of information that are stored in production schedule storage 25, preparation work schedule storage 26, and worker information storage 27 and displays a schedule display screen on display 29.

Here, an example of schedule display screen 50 displayed on display 29 of managing computer 3 is described with reference to FIG. 8. On schedule display screen 50, "production schedule display" region 51, "preparation work schedule display" region 52, "number-of-worker display" region 53, "delete worker" button 54, "add worker" button 55, and "end" button 56 are displayed.

In "production schedule display" region 51, a production schedule (production time) of the mounting board for each lot in component mounting lines L1 to L3 is displayed along production time point 57. In FIG. 8, a production schedule in the line numbers of "L1" of component mounting line L1 and "L2" of component mounting line L2 is displayed. In "production schedule display" region 51, a left end of a frame indicating production time of lots represents the start time point of production, and a right end thereof represents the end time point of production. Within the frame indicating the production time, lot number/model number/number of production/carriage group number are displayed in this order. Further, in "production schedule display" region 51, time for replacement work of carriage group is displayed in a hatched frame with diagonal lines.

Figure 8:
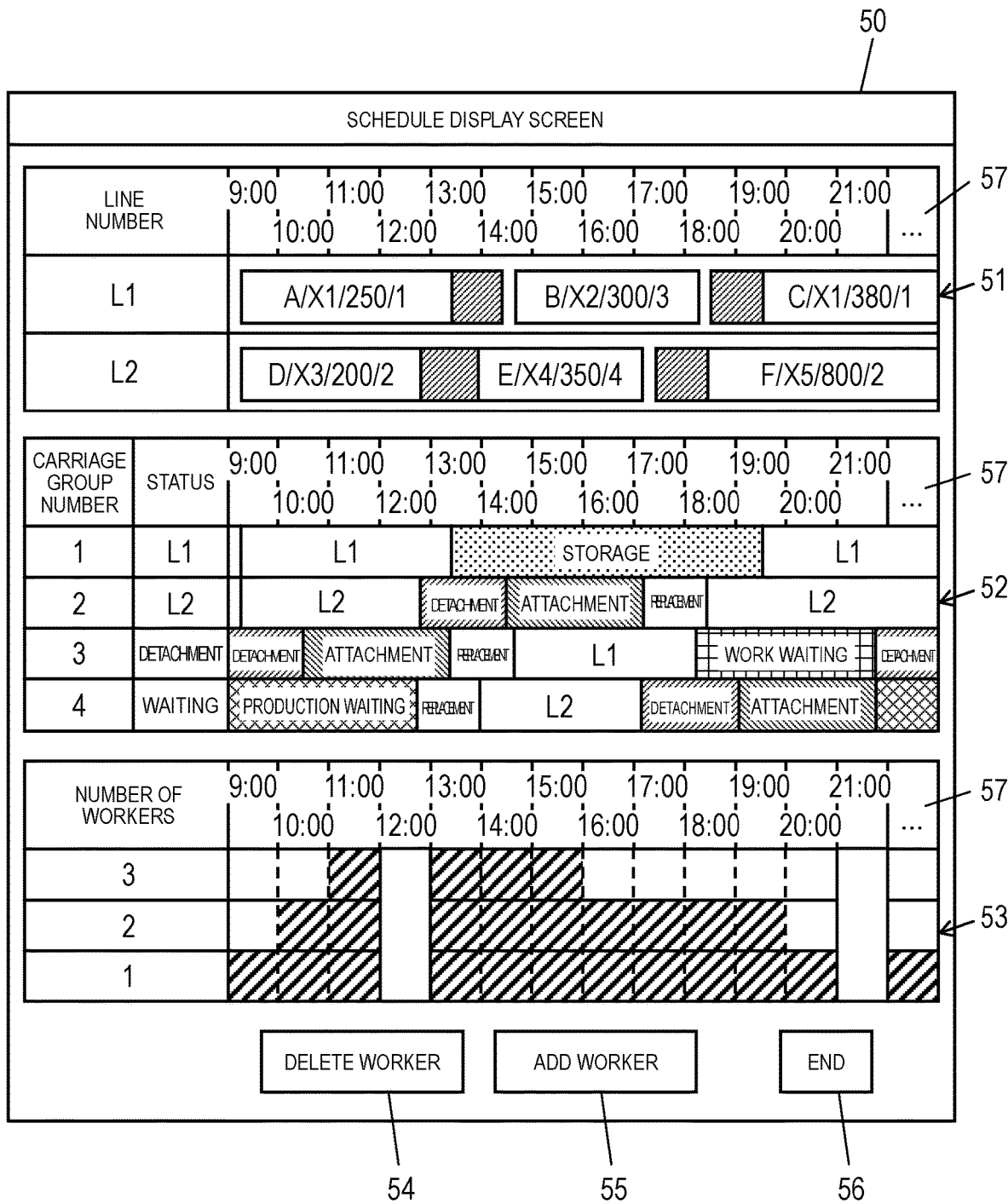
FIG. 8 is a diagram of an example of a schedule display screen displayed on a display of the managing computer (schedule managing apparatus) of the exemplary embodiment of the present disclosure.

In FIG. 8, in "preparation work schedule display" region 52, the preparation work schedule is displayed for each carriage group number along production time point 57. In FIG. 8, the preparation work schedule of the carriage groups of carriage group number "1" to carriage group number "4" is displayed. In "preparation work schedule display" region 52, "detachment" indicates detachment work of tape feeder 9 from carriage 5, "attachment" indicates attachment work of tape feeder 9 to carriage 5 and checking work of reel 17, and "replacement" indicates the replacement work of carriage group in component mounting lines L1 to L3. In "preparation work schedule display" region 52, a left end of a frame indicating work of "detachment" indicates the start time point of arrangement work, and a right end of a frame indicating work of "attachment" indicates the end time point of the arrangement work.

In "preparation work schedule display" region 52, "work waiting" indicates waiting time until the arrangement work is started, and "production waiting" indicates waiting time unit the replacement work is started. In "preparation work schedule display" region 52, "storage" indicates that the carriage groups detached from component mounting lines L1 to L3 by the replacement work are stored in a state in which the carriage group is to be used in the next production as is. In the example in FIG. 8, models of the mounting boards of lot number "A" and lot number "C" have the same model number "X1", and the carriage group having carriage group number "1" is stored from the end time point of the production of lot number "A" to the start time point of production of lot number "C".

In "preparation work schedule display" region 52, "L1" indicates that the carriage group is attached to component mounting line L1, and "L2" indicates that the carriage group is attached to component mounting line L2. In "preparation work schedule display" region 52, "status" indicates a status of each carriage group at a current time point (9:00).

In FIG. 8, in "number-of-worker display" region 53, the number of workers who perform the arrangement work (number of workers), of the workers who work on floor F, is displayed along production time point 57. In FIG. 8, the number of workers (one to three people) for each hour is displayed by a hatched square with diagonal lines. For example, the number of workers from "9:00" to "10:00" is one person, the number of workers from "10:00" to "11:00" is two persons, and the number of workers from "11:00" to "12:00" is three persons. From "12:00" to "13:00" and from "21:00" to "22:00" are break times, and thus the number of workers is 0 person. As described above, display 29 displays the production schedule, the preparation work schedule, and the number of workers along production time point 57.

In "number-of-worker display" region 53, when a manager operates inputter 28 and selects a hated square with diagonal lines so as to operate "delete worker" button 54, input processor 23 deletes the number of workers in the selected production time point 57 so as to update the number of workers of labor schedule information 27a. In addition, in "number-of-worker display" region 53, when the manager operates inputter 28 and selects a square that is not hated with diagonal lines so as to operate "add worker" button 55, input processor 23 adds the number of workers in the selected production time point 57 so as to update the number of workers of labor schedule information 27a.

In other words, inputter 28 and display 29 are a number-of-worker inputter that is used to input the number of workers (number-of-worker) who perform arrangement work, in association with production time point 57 for producing the mounting board (product). When the manager operates "end" button 56 through inputter 28, schedule display screen 50 is ended to transition to a predetermined screen.

In FIG. 5, preparation time point changer 21 changes the start time point or the end time point of the arrangement work in the preparation work schedule based on the work quantity of the arrangement work and the number of workers changed by the number-of-worker inputter (inputter 28 and display 29). The work quantity of the arrangement work is calculated by preparation work quantity calculator 21a that is an internal processor of preparation time point changer 21. More specifically, preparation work quantity calculator 21a calculates a work quantity of the preparation work, which is influenced by changing of the number of workers, from a status (corresponding to the carriage group number and the lot number or the like) of the carriage group which is included in production schedule information 25a, the number of members and the work content of a work target which are included in lot information 25b, and the unit work quantity that is included in unit work quantity information 26c.

For example, in a case where the preparation work that is influenced by the change in the number of workers is the arrangement work in which the arrangement of members (tape feeder 9 and reel 17) of carriage 5 of carriage group number "2" is changed from lot number "D" to lot number "F", a work quantity of the preparation work is obtained as a work quantity "150.6 (persons.minutes)" that is obtained by adding a work quantity "29.4 (persons.minutes)" obtained by multiplying the number of members "98" of lot number "D" that is included in lot information 25b and the unit work quantity "0.3 (persons.minutes)" of "detachment of the tape feeder from the carriage" which is included in unit work quantity information 26c and a work quantity "20.2 (persons.minutes)" to work quantity "101 (persons.minutes)" obtained by multiplying the unit work quantity "1.0 (persons.minutes)" of "attachment of the tape feeder to the carriage" in the number of components "101" of lot number "F" and unit work quantity "0.2 (persons.minutes)" of "checking of the tape feeder and the reel".

In a case where there are a plurality of types of preparation work which is influenced by the change in the number of workers, the work quantity of preparation work for each piece of preparation work is calculated. In addition, in a case where the preparation work, which is influenced by the change in the number of workers, is changed during the preparation, the work quantity of preparation work for the influenced preparation work is calculated.

Preparation time point changer 21 calculates working time by dividing the calculated work quantity by the number of workers and changes the start time point and the end time point of the arrangement work, which receives the influence so as to update the preparation work schedule information 26a. The work quantity of the arrangement work is calculated in advance so as to be stored in preparation work schedule storage 26, and preparation time point changer 21 may acquire a work quantity of a lot which is influenced by the change in the number of workers by preparation work schedule storage 26 so as to change the start time point and the end time point of the arrangement work.

In FIG. 5, production time point changer 22 changes the start time point or the end time point of the production of the mounting board (product) in the production schedule based on the start time point or the end time point of the changed arrangement work so as to update production schedule information 25a. Display processor 24 updates a schedule display screen that is displayed by display 29, based on updated production schedule information 25a, preparation work schedule information 26a, and labor schedule information 27a.

Figure 9:
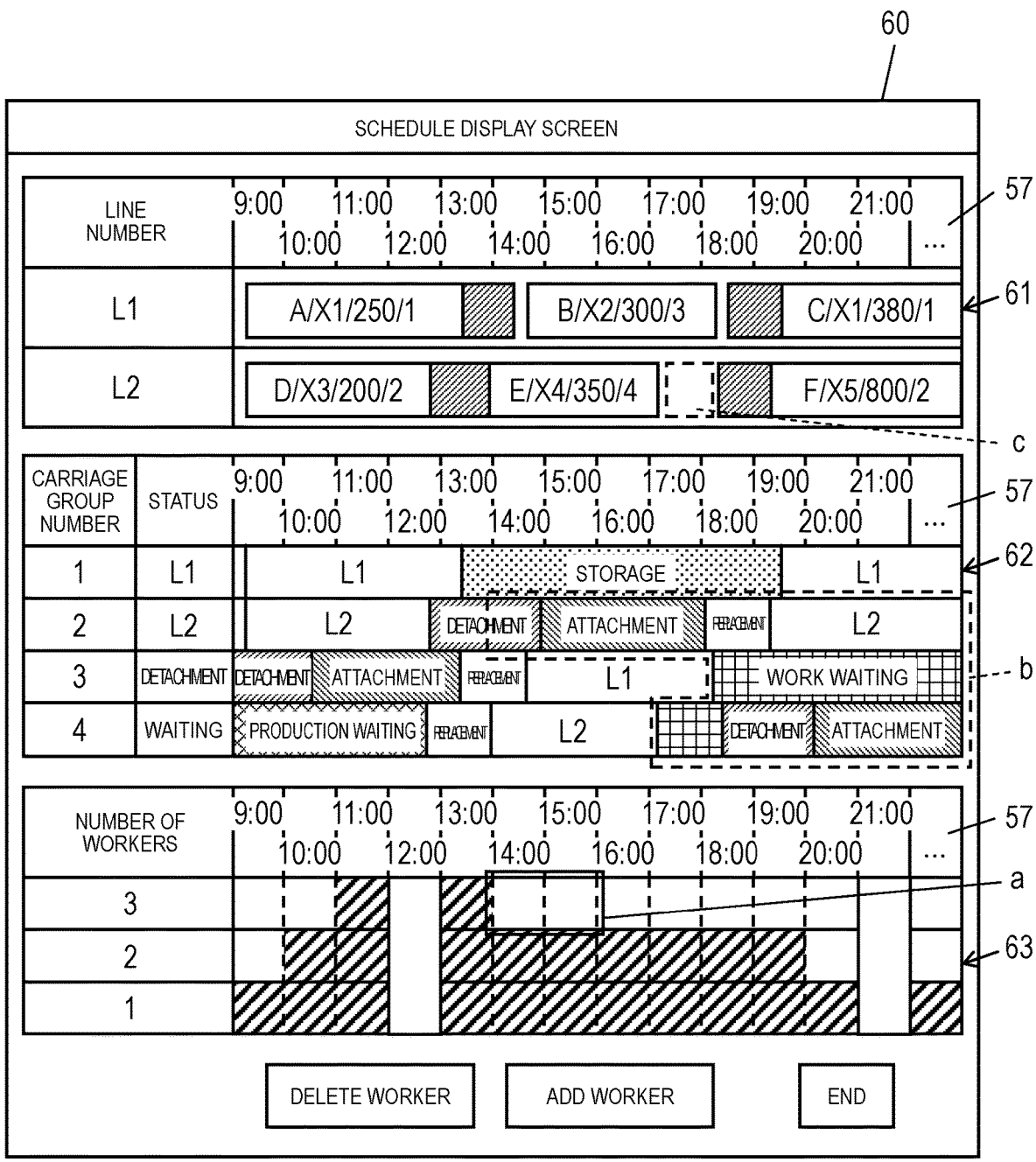
FIG. 9 is a diagram of an example of an updated schedule display screen displayed on a display of the managing computer (schedule managing apparatus) of the exemplary embodiment of the present disclosure.

Next, updated schedule display screen 60 will be described with reference to FIG. 9. Schedule display screen 60 illustrated in FIG. 9 is the updated schedule display screen 60 obtained by decreasing the number of workers from three workers to two workers from "14:00" to "16:00" from schedule display screen 50 illustrated in FIG. 8. In "number-of-worker display" region 63, the number of workers corresponding to the square from "14:00" to "16:00" illustrated as rectangle a is reduced. In "preparation work schedule display" region 62, the start time point and the end time point of the arrangement work of carriage group numbers "2", "3", and "4" after "14:00", which is represented by polygon b, are changed by preparation time point changer 21.

In "production schedule display" region 61, the start time point of the production of lot number "F" which is produced in component mounting line L2 is changed by production time point changer 22, depending on the change of the end time point of the arrangement work of carriage group number "2". Consequently, waiting time represented by rectangle c is generated between the end time point of the production of lot number "E" and the start time point of the replacement work of carriage group number "2" of lot number "F". As described above, when an increase or a decrease in the number of workers is input by the number-of-worker inputter (inputter 28 and display 29), the production schedule, the preparation work schedule, and the number of workers which are displayed on display 29 are updated.

Figure 10:
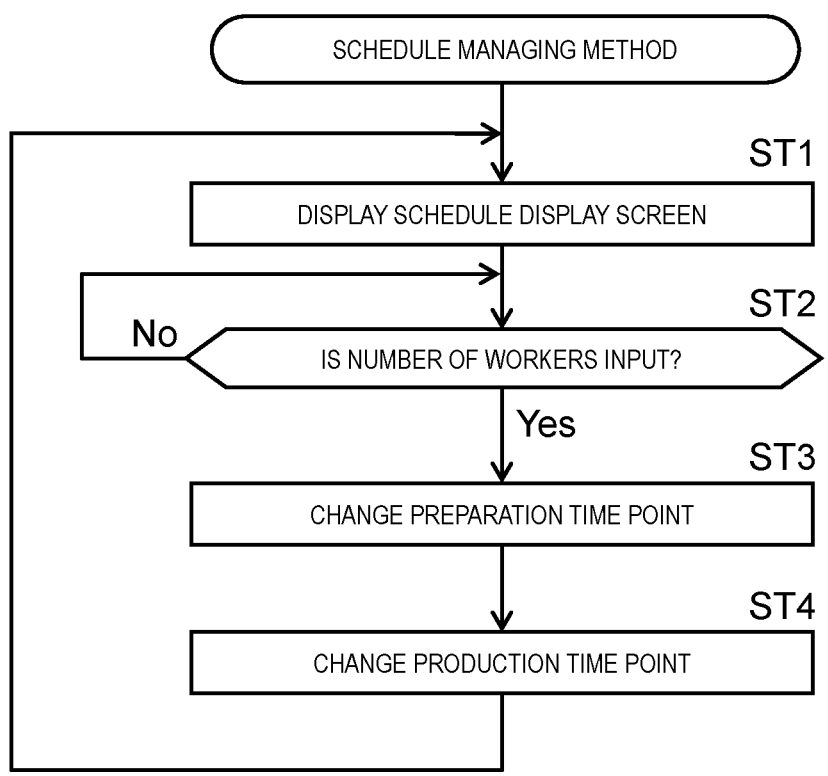
FIG. 10 is a flowchart of a schedule managing method in the managing computer (schedule managing apparatus) of the exemplary embodiment of the present disclosure.

Next, a schedule managing method that is displayed on the schedule display screen by display 29 in managing computer 3 (schedule managing apparatus) that manages the production schedule and the preparation work schedule will be described along a flow of FIG. 10. First, display processor 24 displays schedule display screen 50 (refer to FIG. 8) on display 29 based on various items of information that are stored in production schedule storage 25, preparation work schedule storage 26, and worker information storage 27 (ST1: displaying step). Consequently, the production schedule, the preparation work schedule, and the number of workers are displayed on display 29 along production time point 57. Subsequently, the number-of-worker inputter (inputter 28 and display 29) is used to input the number of workers (number-of-worker) who perform the arrangement work, in association with production time point 57 for producing the mounting board (product) (ST2: number-of-worker inputting step).

When the increase or the decrease in the number of workers is input (Yes in ST2), preparation time point changer 21 changes the start time point or the end time point of the arrangement work in the preparation work schedule based on the work quantity of the arrangement work and the number of workers (ST3: preparation time point changing step). Subsequently, production time point changer 22 changes the start time point or the end time point of the production of the mounting board (product) in the production schedule based on the start time point or the end time point of the changed arrangement work (ST4: production time point changing step).

Subsequently, the process returns to the displaying step (ST1) such that updated schedule display screen 60 (refer to FIG. 9) is displayed on display 29. In other words, when the increase or the decrease in the number of workers is input in the number-of-worker inputting step (ST2), the preparation time point changing step (ST3), the production time point changing step (ST4), and the displaying step (ST1) are performed.

As described above, managing computer 3 of the exemplary embodiment is the schedule managing apparatus that manages the production schedule and the preparation work schedule. Managing computer 3 includes the number-of-worker inputter (inputter 28 and display 29) that inputs the number of workers who perform the arrangement work of arranging the members (tape feeder 9 and reel 17) on the arrangement means (carriage 5), in association with the production time point for producing the product and preparation time point changer 21 that changes the start time point or the end time point of the arrangement work in the preparation work schedule based on the work quantity of the arrangement work and the number of workers. Further, managing computer 3 includes production time point changer 22 that changes the start time point or the end time point of the production of the product in the production schedule based on the start time point or the end time point of the changed arrangement work and display 29 that displays the production schedule, the preparation work schedule, and the number of workers along a production time point.

Consequently, it is possible to easily know a relationship between the production schedule of the product (mounting board) in the production lines (component mounting lines L1 to L3) and the number of workers who are employed in the preparation work of the production (number of workers).

As described above, the description is provided based on the exemplary embodiments of the present disclosure. Various modification examples can be made from the embodiments by combining the types of products which are produced in the production lines, and thus those skilled in the art understand that the modification examples are also included within the scope of the present disclosure. For example, the production line may be a home appliance production line through which home appliances as products are assembled or may be a food processing line through which a food processing product as a product is manufactured.

The schedule managing method and the schedule managing apparatus of the present disclosure have an effect in which it is possible to easily know the relationship between the production schedule of the product in the production line and the number of workers who are employed in preparation work of the production and are applied in a field of mounting an electronic component on a board.

What is claimed is:

1. A component mounting system, the system comprising:
a plurality of component mounting lines arranged in a production area;
at least one arrangement work supporting device disposed in a preparation area;
a plurality of carriages disposed in the preparation area, at least one of the plurality of carriages connected to the arrangement work supporting device;
a managing computer connected to the arrangement work supporting device via a communication network, the arrangement work supporting device transmitting information via the communication network to the managing computer regarding the connected carriage, the managing computer including:
a display that displays, on a single screen, a first region displaying a production schedule for the production line, a second region displaying a preparation work schedule for the arrangement work supporting device, and a third region displaying a number of workers, each of the first region, the second region, and the third region being displayed along a common production time point;
an input device used to input and change a number of workers displayed in the third region, the third region displaying the number of workers scheduled to perform an arrangement work of arranging members to a carriage provided carrier tape in association with the production time point; and
a processor comprising:
a preparation time point changer that, in response to a change to a number of workers input via the input device, changes a start time point or an end time point of the arrangement work in the preparation work schedule displayed in the second region based on: information acquired from the arrangement work supporting device, a work quantity of the arrangement work, and the number of workers input via the input device; and
a production time point changer that, in response to a change in the preparation work schedule, changes a start time point or an end time point of the production of the products in the production schedule displayed in the first region based on the changed start time point or an end time point of the changed arrangement work by the preparation time point changer,
wherein the managing computer manages the plurality of component mounting lines via the communication network, the arrangement work is performed on the carriage connected to the arrangement work supporting device according to the updated preparation work schedule, and the component mounting lines produce a plurality of mounting boards according to the updated production schedule.

2. The component mounting system of claim 1, wherein the arrangement work includes at least one of work of detaching a member from the carriage provided carrier tape, work of attaching a member to the carriage provided carrier tape, and work of checking a member attached to the carriage provided carrier tape.

3. The component mounting system of claim 1, the managing computer further comprising a production schedule storage that stores production schedule information.

4. The component mounting system of claim 1, the managing computer further comprising a preparation work schedule storage that stores preparation work schedule information and carriage information.

5. The component mounting system of claim 1, the managing computer further comprising a worker information storage that stores labor schedule information.

6. The component mounting system of claim 1, wherein the arrangement work performed in the preparation area is performed in parallel with the production of mounting boards in the production area.

7. The component mounting system of claim 1, wherein each component mounting line includes a solder printing device, a component mounter, and a reflow device, each of the solder printing device, component mounter, and reflow device being connected to the managing computer via the communication network.

8. The component mounting system of claim 1, wherein the preparation work schedule and the production schedule are updated when an increase or decrease in the number of workers is made via the input device.

\* \* \* \* \*